(12) United States Patent
Ma

(10) Patent No.: US 8,953,733 B2
(45) Date of Patent: Feb. 10, 2015

(54) METHOD FOR JOINT CONFIGURATION OF NUCLEAR POWER PLANT FUEL

(75) Inventor: Zirong Ma, Shenzhen (CN)

(73) Assignees: China Nuclear Power Engineering Compay Ltd., Futian District, Shenzhen, Guangdong (CN); China Nuclear Power Technology Research Institute, Futian District, Shenzhen, Guangdong (CN); China Guangdong Nuclear Power Holding Corporation, Futian District, Shenzhen, Guangdong (CN)

( * ) Notice: Subject to any disclaimer, the term of this patent is extended or adjusted under 35 U.S.C. 154(b) by 365 days.

(21) Appl. No.: 13/322,551

(22) PCT Filed: May 21, 2010

(86) PCT No.: PCT/CN2010/073041
§ 371 (c)(1),
(2), (4) Date: Nov. 26, 2011

(87) PCT Pub. No.: WO2010/135968
PCT Pub. Date: Dec. 2, 2010

(65) Prior Publication Data
US 2012/0069948 A1 Mar. 22, 2012

(30) Foreign Application Priority Data
May 27, 2009 (CN) .......................... 2009 1 0107548

(51) Int. Cl.
| | |
|---|---|
| G21C 19/02 | (2006.01) |
| G21C 19/20 | (2006.01) |
| G21C 19/00 | (2006.01) |
| G21C 3/30 | (2006.01) |
| G21D 3/00 | (2006.01) |

(52) U.S. Cl.
CPC ........ *G21C 19/205* (2013.01); *G21D 2003/004* (2013.01); *G21D 2003/002* (2013.01)
USPC ........... 376/267; 376/260; 376/261; 376/264; 376/272; 376/409

(58) Field of Classification Search
USPC .................. 376/260–272, 409, 426, 434, 463
See application file for complete search history.

(56) References Cited

U.S. PATENT DOCUMENTS

| | | | | |
|---|---|---|---|---|
| 3,432,389 | A * | 3/1969 | Stern | 376/267 |
| 3,503,849 | A * | 3/1970 | Yevick et al. | 376/262 |
| 3,904,048 | A * | 9/1975 | Van Santen et al. | 376/271 |
| 4,040,902 | A * | 8/1977 | Mysels | 376/267 |
| 4,167,442 | A * | 9/1979 | Timofeev et al. | 376/271 |
| 4,451,427 | A * | 5/1984 | Ross et al. | 376/267 |
| 5,631,939 | A * | 5/1997 | Haraguchi et al. | 376/267 |

* cited by examiner

*Primary Examiner* — Bernarr Gregory
(74) *Attorney, Agent, or Firm* — Tianhua Gu; Global IP Services

(57) ABSTRACT

A method for joint configuration of nuclear power plant fuel includes the following steps: (S1) for at least one operating unit, based on an equilibrium cycle or transition cycle reactor core design, at least one new fuel element is added to at least one operating unit; (S2) after running a combustion cycle, and on basis of the new fuel elements in step (S1), more first spent fuel elements are obtained from the at least one operating unit than are obtained from the equilibrium cycle or transition cycle reactor core design, and said first spent fuel elements are kept in reserve; (S3) for at least one new starting unit, a scheduled number of new fuel elements, as well as the first spent fuel elements obtained for reserve in step (S2), are set in the first reactor cores of at least one new starting unit.

19 Claims, 16 Drawing Sheets

4.45%
New fuel assemblies 4.45%
Spent fuel assemblies
having burned once 4.45%
Spent fuel assemblies
having burned twice 4.45% New fuel assemblies 4.45% Spent fuel assemblies having burned once 4.45% Spent fuel assemblies having burned twice ● Enrichment Ratio: 4.45%, Burnup: 55000MWd/tU

METHOD FOR JOINT CONFIGURATION OF NUCLEAR POWER PLANT FUEL

CROSS REFERENCE TO RELATED PATENT APPLICATION

The present application is the US national stage of PCT/CN2010/073041 filed on May 21, 2010, which claims the priority of the Chinese patent application No. 200910107548.5 filed on May 27, 2009, which application is incorporated herein by reference.

FIELD OF THE INVENTION

The invention relates to a method for joint configuration design of fuel elements/assemblies, and more particularly relates to a method for joint configuration design of nuclear power plant fuel elements/assemblies so as to improve the fuel utilization.

BACKGROUND OF THE INVENTION

Nuclear power is a new energy which has been paid more and more attention since the first nuclear power plant was built in 1950s. According to statistics, about 441 nuclear power plants have been built in more than 30 countries and regions in the world by the end of 2002, and the generation capacity is about 360 million kilowatts. Now about 40 nuclear power plants are being built and about 60 nuclear power plants are to be built. After completion, the generation capacity will be up to 500 million kilowatts which will take up about 20% of the world's total generating capacity at that time. Uranium or plutonium are generally utilized as nuclear fuel in the nuclear reactor, wherein, the fission chain reaction is conducted in a controlled manner and then fission energy is produced continuously from a special atomic boiler for doing work.

Now a research for joint configuration of nuclear fuel elements/assemblies among the different reactor types of the nuclear power plant is being conducted. As the shape of fuel elements/assemblies varies as the reactor type, during the joint configuration of nuclear fuel elements/assemblies among different reactor types, the fuel elements/assemblies will experience disintegration and recombinant. While among several units of the same reactor type with interchangeable fuel elements/assemblies, the configuration design of the nuclear fuel elements/assemblies in reactor core is relatively independent and lack of unified coordinate optimization.

Under the condition where the configuration design of the nuclear fuel elements/assemblies in reactor core is relatively independent, the fuel elements/assemblies loaded in the first reactor core (it is the core of the first cycle for the reactor type refueling when shutdown) generally are all new fuel elements/assemblies. There three enrichments for the new fuel assemblies are generally used. To take the first reactor core of Daya Bay Nuclear Power Station for example, three enrichments by mass of uranium 235 for the new fuel assemblies are 1.8%, 2.4% and 3.1% respectively.

A method for optimizing the arrangement of the enrichments and quantity of the first reactor core according to the reactivity distribution in the equilibrium cycle is provided in a Chinese published application CN 200510071705.3 of Westinghouse Company, so as to save uranium resources and reach the equilibrium cycle more quickly. The first reactor core configuration design is entirely independent and all the fuel assemblies loaded are still new, except that the range of the enrichments is wider, the types of the new fuel assemblies are more and a low-leakage loading patterns is utilized.

In the method provided in a Japanese published application JP 61-66988A of Toshiba Company, the spent fuel assemblies that can not be used by the operating units any longer are loaded in the first reactor core of the boiling water reactor to replace the new fuel assemblies with natural enrichment, so as to save the natural uranium, manufacturing and the spent fuel disposal cost of the replaced new fuel assemblies. However, this method has serious limitations. For example, in the first reactor core of the pressurized water reactor, the enrichments of the new fuel assemblies in use are generally much higher than that of nature uranium (for example, the smallest enrichment of the new fuel assemblies used in the first reactor core of Daya Bay Nuclear Power Station is 1.8% that is much higher than that of natural uranium with value of 0.71%), and there is no suitable alternative in the first core for the spent fuel assemblies that can not be used any longer by the operating units, resulting in small scope of application and less practical value to other reactor types, and just saving the cost of the new fuel assemblies with natural enrichment for the boiling water reactor which has small effect compared with the cost of the first core. Moreover, the first reactor core configuration design is still completely independent, and just the spent fuel assemblies that can not be used by the operating units any longer is loaded, such that there is no interaction and effect on the reactor core configuration design of the units that have been running

SUMMARY OF THE INVENTION

An objective of this invention is aimed to the disadvantage that, in the prior art, among several units of the same reactor type with interchangeable fuel elements/assemblies, the configuration design of the nuclear fuel elements/assemblies in reactor core is relatively independent and lack of unified coordinate optimization, and the fuel burnup is low, and then to provide a method for joint configuration design of nuclear power plant fuel elements/assemblies.

A technical solution utilized in this invention to solve its technical problem is providing a method for joint configuration design of nuclear power plant fuel elements/assemblies, comprising steps implemented in fuel elements/assemblies joint configuration design conducted between at least one operating unit and at least one new starting unit with the first core:

(S1) for at least one operating unit, based on an equilibrium cycle or transition cycle reactor core configuration design, adding at least one new fuel element/assembly to the at least one operating unit, wherein, for a reactor type refueling when non-shutdown, adding at least one new fuel element/assembly means adding more new fuel elements/assemblies in a period of time;

(S2) after running a fuel cycle, and on the basis of the added new fuel elements/assemblies loaded in step (S1), obtaining more spent fuel elements/assemblies having burned once from the at least one operating unit than that obtained in the reactor core configuration design of the equilibrium cycle or original transition cycle, and keeping said spent fuel elements/assemblies in reserve; wherein, with respect to the reactor type refueling when shutdown, after running one fuel cycle, based on the added new fuel elements/assemblies loaded in step (S1), more spent fuel elements/assemblies having burned once are obtained from the at least one operating unit than that are obtained in the reactor core configuration design of the equilibrium cycle or original transition cycle for reserve; with respect to the reactor type refueling when non-shutdown, after the at least one operating unit has been running for a period of time, based on the added new fuel elements/assemblies loaded in step (S1), more spent fuel elements/assemblies having burned partially are obtained than that are obtained in the reactor core configuration design of the equilibrium cycle or original transition cycle for reserve.

(S3) for at least one new starting unit with the first core, arranging a scheduled number of new fuel elements/assemblies and the spent fuel elements/assemblies in reserve having burned once which are obtained from step (S2) in the first reactor cores of at least one new starting unit, wherein, for at least one new starting unit with the first core, with respect to the reactor type refueling when shutdown, the scheduled number of new fuel elements/assemblies and the spent fuel elements/assemblies in reserve having burned once which are obtained from step (S2) are arranged in the first reactor cores of at least one new starting unit; with respect to the reactor type refueling when non-shutdown, the scheduled number of new fuel elements/assemblies and the spent fuel elements/assemblies in reserve having burned partially which are obtained from step (S2) are arranged in the first reactor cores of at least one new starting unit.

The spent fuel elements/assemblies having burned once and the spent fuel elements/assemblies having burned twice described herein are defined by the roughly reactivity after the fuel elements/assemblies have burned once and twice respectively, rather than by the real loaded times. For the reactor core comprising the new fuel elements/assemblies, the spent fuel elements/assemblies having burned once, the spent fuel elements/assemblies having burned twice and the spent fuel elements/assemblies having burned more times, the method for obtaining and using the spent fuel elements/assemblies in reserve having burned once which is mentioned in steps (S1), (S2) and (S3) also comprises the method for obtaining and using the spent fuel elements/assemblies having burned once, the spent fuel elements/assemblies having burned twice and the spent fuel elements/assemblies having burned more times in such reactor core.

The method for joint configuration design of nuclear power plant fuel elements/assemblies of the present invention, between the steps (S2) and (S3) further comprises storage of the spent fuel elements/assemblies in reserve having burned once which are obtained from step (S2) in the spent fuel pool or spent fuel storage container, so as to satisfy the requirements of transportation safely after storage, that is storing the spent fuel elements/assemblies having burned once and the spent fuel elements/assemblies having burned twice in step (S2) (with respect to the reactor type refueling when shutdown), and the spent fuel elements/assemblies having burned partially (with respect to the reactor type refueling when non-shutdown), once the requirements for transportation comprising the criticality safety, radiation shielding, cooling and so on are satisfied, the spent fuel elements/assemblies in reserve to be used are transported from the operating units to the new starting units with the first cores by the transporting container of spent fuel.

In the method for joint configuration design of nuclear power plant fuel elements/assemblies of the present invention, the arrangement of the first reactor core of the at least one new starting unit is based on the refueling mode in which the at least one operating units are added with the new fuel elements/assemblies before or after.

In the method for joint configuration design of nuclear power plant fuel elements/assemblies of the present invention, the spent fuel elements/assemblies having burned once and the new fuel elements/assemblies are arranged alternatively in the reactor core of the at least one operating unit or in the first reactor core of the new starting unit, such that the new fuel elements/assemblies are arranged around the spent fuel elements/assemblies having burned once. Such alternative arrangement can improve the burnup of the spent fuel elements/assemblies having burned once in the present cycle, improve the discharge burnup, and improve the fuel efficiency.

In the method for joint configuration design of nuclear power plant fuel elements/assemblies of the present invention, the step (S3) also comprises arranging a scheduled number of spent fuel elements/assemblies having burned twice taken from the at least one operating unit into the first reactor core of the new starting unit.

In the method for joint configuration design of nuclear power plant fuel elements/assemblies of the present invention, in step (S1), for at least one operating unit, 1~29 new fuel assemblies are added to the at least one operating unit, based on the equilibrium cycle or transition cycle reactor core configuration design; wherein, with respect to the reactor core with 157 fuel assemblies, 1~29 new fuel assemblies are added to the at least one operating unit, such that number of the new fuel assemblies is up to 101; the reactor core with more fuel assemblies can be added with more new fuel assemblies; with respect to the reactor type refueling when non-shutdown, the addition means loading more new fuel assemblies during a period of time.

In the method for joint configuration design of nuclear power plant fuel elements/assemblies of the present invention, 1, 4, 5, 8, 9, 12, 13, 16, 17, 20, 21, 24, 25, 28 or 29 new fuel assemblies are added to the at least one operating unit. The method of adding fuel elements/assemblies is applicable to the reactor core having the central fuel assembly and showing a quarter-symmetry. The added quantity varies correspondingly with respect to the reactor core showing other symmetry or in other refueling modes.

In the method for joint configuration design of nuclear power plant fuel elements/assemblies of the present invention, in step (S1), the reactor cores of the at least one operating unit have 157 fuel assemblies;

In step (S3), the first reactor cores of the at least one new starting unit comprise 80~100 new fuel assemblies, 30~49 spent fuel assemblies having burned once and the rest spent fuel assemblies having burned twice.

In the method for joint configuration design of nuclear power plant fuel elements/assemblies of the present invention, there are several operating units which comprise long-term refueling and short-term refueling units; and there are steps implemented in the joint configuration of fuel assemblies conducted among the operating units:

(B1) based on the reactor cores configuration design of the long-term equilibrium cycle or transition cycle, the spent fuel assemblies having burned once which are arranged in the peripheral places of the loading pattern are replaced by the spent fuel assemblies having burned twice, so as to obtain excess spent fuel assemblies having burned once for reserve;

(B2) the excess spent fuel assemblies having burned once for reserve and the spent fuel assemblies in the long-term operating units are arranged in the short-term operating units.

In the method for joint configuration design of nuclear power plant fuel elements/assemblies of the present invention, the long-term operating units described herein are the units refueling every 18 months or every 24 months; the short-term operating units described herein are the units refueling quarter or third of the fuel assemblies every year.

In the method for joint configuration design of nuclear power plant fuel elements/assemblies of the present invention, the new fuel assemblies are with relatively high enrichments equal to that of the new fuel assemblies used in the equilibrium cycle.

By implementing the method for joint configuration design of nuclear power plant fuel elements/assemblies of the present invention, there are following advantageous effects: several operating units with interchangeable fuel elements/assemblies are joined for nuclear fuel elements/assemblies configuration, such that the operating units and the new starting units with the first cores, and the operating units in different refueling modes can interact, coordinate optimization, and complement each other respectively; all the new fuel elements/assemblies are with relatively high enrichments same or equivalent to that of the new fuel elements/assemblies used in the equilibrium cycle; in the first reactor core of the new starting units, a part of spent fuel elements/assemblies have burned a certain number of cycles, such as one, two or more cycles, while burned for a period time with respect to the reactor type refueling when non-shutdown, so as to satisfy the reactivity requirements for constructing the first reactor cores of the new starting units, resulting in that a variety of desired refueling modes can be implemented in the first reactor cores for the reactor type refueling when shutdown; furthermore, the ability of units to resist risks (a number of fuel elements/assemblies are damaged) can be improved, the method is suitable for both the reactor type refueling when shutdown and non-shutdown, and for (pressurized-water reactor) (PWR), boiling water reactor (BWR), heavy water reactor (HWR), and high temperature reactor (HTR).

DETAILED DESCRIPTION OF THE PREFERRED EMBODIMENT

Figure 1:
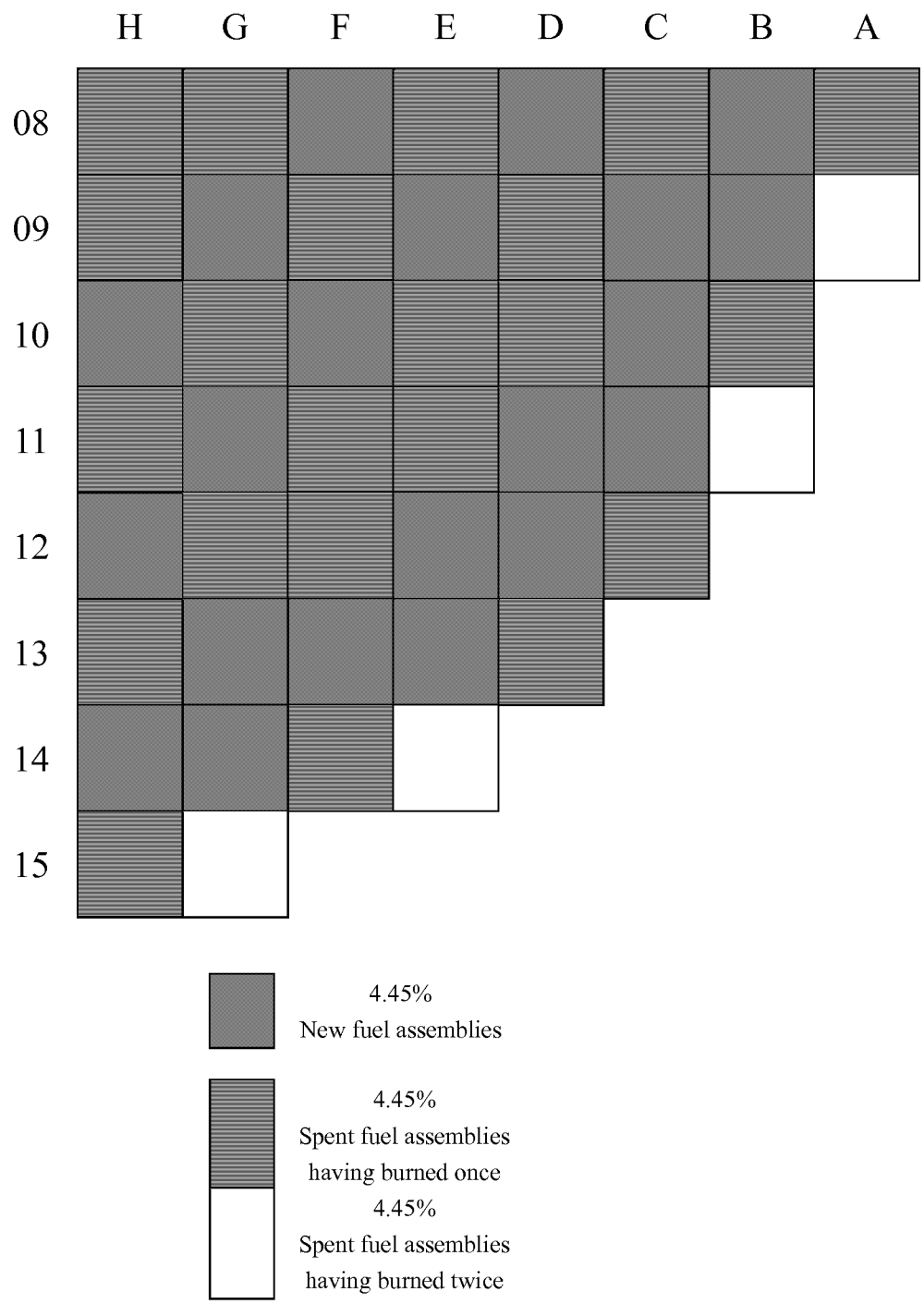
FIG. 1 is a loading pattern of the equilibrium cycle reactor core with 72 new fuel assemblies in the prior art.

The technical solution of the present invention is about a design for nuclear fuel elements/assemblies configuration conducted jointly by several units with interchangeable fuel elements/assemblies. The first core of the new starting units may totally use the fuel elements/assemblies with relatively high enrichments which are identical or equivalent to the equilibrium cycle enrichments. Wherein, a part of new fuel elements/assemblies with relatively high enrichments may be put into one or more operating units for combustion, such that the new fuel elements/assemblies loaded in the operating units is much more than when such method is not implemented, and then considerable spent fuel elements/assemblies having burned once are obtained. Meanwhile, considerable spent fuel elements/assemblies having burned twice may be provided by the operating units additionally (taking the reactor core with 157 fuel assemblies refueling every 18 months for example). From the considerable obtained spent fuel elements/assemblies having burned once and spent fuel elements/assemblies having burned twice, the spent fuel elements/assemblies with the desired quantity and burnup may be selected to construct the first reactor cores of the new starting units together with new fuel elements/assemblies with relatively high enrichments. After the method for joint configuration design of nuclear fuel elements/assemblies has been implemented, the average discharge burnup of the operating units added with new fuel elements/assemblies and the first reactor cores of the new starting units (if the arrangement mode is utilized in which the operating units have been added with new fuel elements/assemblies) is higher than that of the equilibrium cycle (generally, the average discharge burnup of the first reactor cores of the new starting unit is less than 50% of that of the equilibrium cycle).

Specific steps are as follows:

(S1) for at least one operating unit, based on the reactor core configuration design of the equilibrium cycle or transition cycle, at least one new fuel element/assembly is added to at least one operating unit, such as 1~29 new fuel assemblies;

(S2) after running a fuel cycle, and on basis of the new fuel elements/assemblies added in step (S1), more spent fuel elements/assemblies having burned once which are obtained from the at least one operating unit than that are obtained in the reactor core configuration design of the equilibrium cycle or transition cycle, and said spent fuel elements/assemblies are kept in reserve;

the spent fuel elements/assemblies in reserve having burned once which are obtained from step (S2) are stored in the spent fuel pool; once the requirements for transporting comprising the criticality safety, radiation shielding, cooling and so on are satisfied, the spent fuel elements/assemblies in reserve to be used may be transported from the operating units to new starting units with the first cores by the transporting containers of spent fuel.

(S3) for at least one new starting unit with the first core, a scheduled number of new fuel elements/assemblies, the spent fuel elements/assemblies in reserve having burned once which are obtained from step (S2), and a scheduled number of the spent fuel elements/assemblies having burned twice are arranged in the first reactor cores of at least one new starting unit.

In the reactor core configuration design of the present invention, the reactor core with 157 fuel assemblies of pressurized-water reactor (PWR) nuclear power plant refueling every 18 months is taken as an example for illustration, wherein, the reactor core comprises the new fuel elements/assemblies, the spent fuel elements/assemblies having burned once and the spent fuel elements/assemblies having burned twice. The spent fuel elements/assemblies having burned once and the spent fuel elements/assemblies having burned twice described herein are defined by the roughly reactivity after the fuel elements/assemblies have burned once and twice respectively, rather than by the real loaded times. For the reactor core comprising the new fuel elements/assemblies, the spent fuel elements/assemblies having burned once, the spent fuel elements/assemblies having burned twice and the spent fuel elements/assemblies having burned more times, the method for obtaining and using the spent fuel elements/assemblies in reserve having burned once which is mentioned in steps (S1), (S2) and (S3) also comprises the method for obtaining and using the spent fuel elements/assemblies having burned once, the spent fuel elements/assemblies having burned twice and the spent fuel elements/assemblies having burned more times in such reactor core.

There is no restriction for the refueling mode of the operating units involved in the method for the joint configuration of nuclear power plant fuel elements/assemblies according to the present invention, and a variety of refueling mode may be implemented directly in the first cores of the new starting units. The method is suitable for the reactor types both with refueling when shutdown and with refueling when non-shutdown, and also for PWR, BWR, DUR, and HTR.

To take the PWR nuclear power plant having the reactor with 157 fuel elements/assemblies and refueling when shutdown for example, exemplary embodiments about the fuel elements/assemblies joint configuration of one operating unit and one same type new starting unit with the first core will be illustrated as followed.

Figure 13:
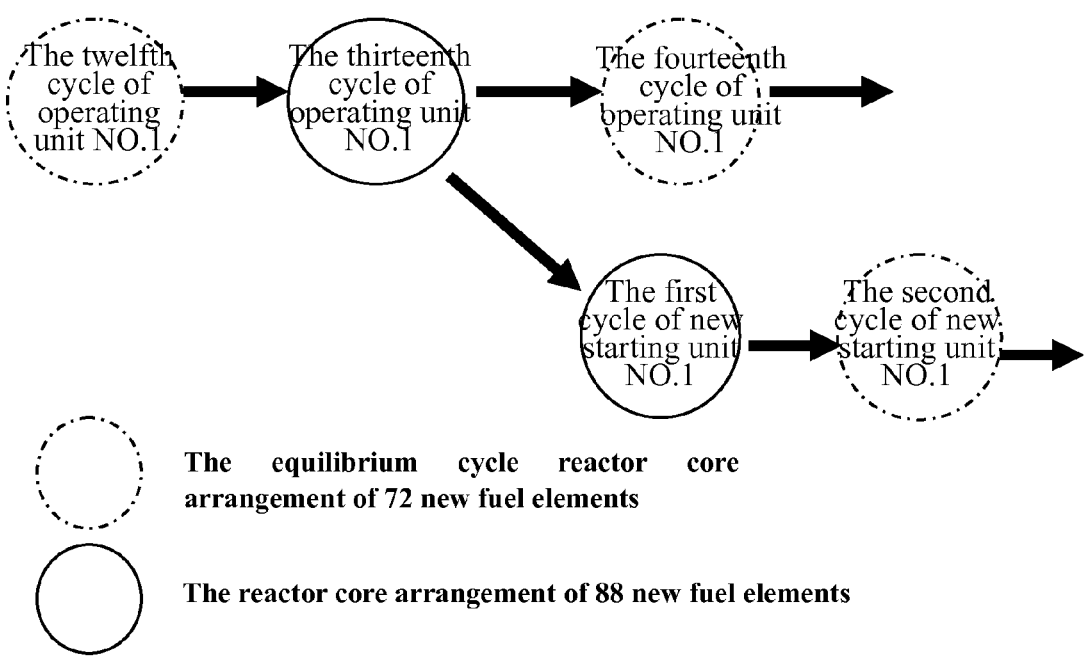
FIG. 13 is a schematic view of the joint configuration with only one new starting unit in the method for the joint configuration of nuclear power plant fuel elements/assemblies according to the present invention.

FIG. 13 is the schematic diagram of joint configuration of nuclear power plant fuel assemblies with only one new starting unit with the first core. The arrows in the figure just indicate the transfer of the spent fuel elements/assemblies having burned once and the spent fuel elements/assemblies having burned twice. While the new fuel elements/assemblies are purchased from suppliers. The twelfth cycle of operating unit NO. 1, the fourteenth cycle of operating unit NO. 1 and the second cycle of new starting unit NO. 1 shown in FIG. 13 are all in the known equilibrium cycle refueling every 18 months in which 72 new fuel assemblies loaded. The other two cycles that is the thirteenth cycle of operating unit NO. 1 and the first cycle of new starting unit NO. 1 are both in the mode refueling every 18 months in which 88 new fuel assemblies loaded. Specially, as compared to 72 new fuel assemblies with an enrichment of 4.45% needed in the equilibrium cycle, additional 16 new fuel assemblies with an enrichment of 4.45% are added in the thirteenth cycle of operating unit NO. 1, such that the new fuel assemblies total up to 88. And the first cycle of new starting unit NO. 1 (the first reactor core) can obtain 41 spent fuel assemblies having burned once and 28 spent fuel assemblies having burned twice from the operating unit NO. 1.

Figure 15:
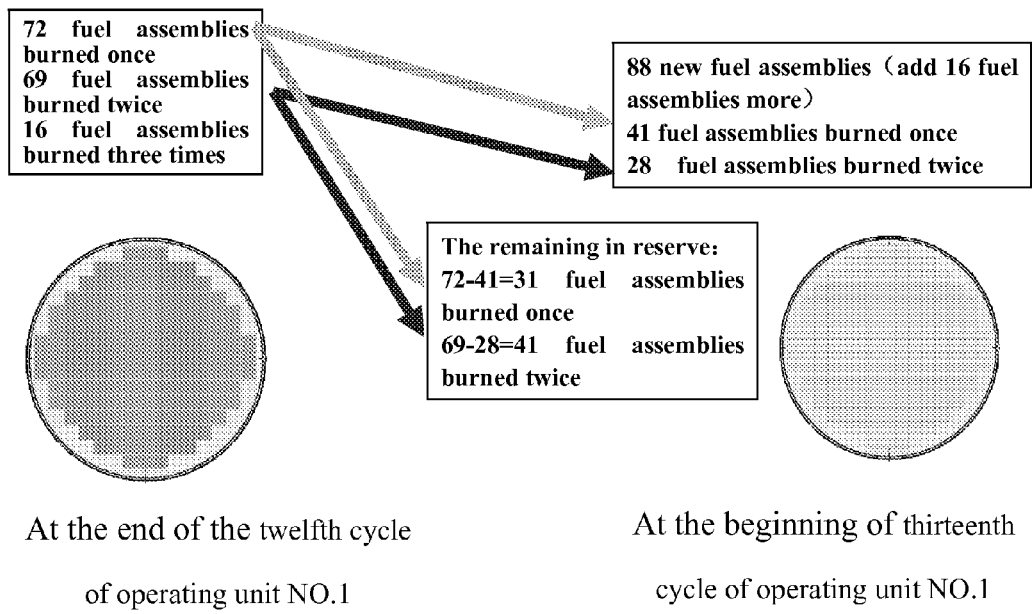
FIG. 15 is a schematic view when the arrangement with 72 new fuel assemblies in the operating units is changed to that with 88 new fuel assemblies in the method for the joint configuration of nuclear power plant fuel elements/assemblies according to the present invention.

FIG. 1 shows the equilibrium cycle of the operating units refueling every 18 months. 72 new fuel assemblies with an enrichment of 4.45% are added to each cycle. The reactor core comprises 72 new fuel assemblies, 69 spent fuel assemblies having burned once and 16 spent fuel assemblies having burned twice. The reactor core configuration design is in symmetry of quarter rotation, and what shown in the figure is one quarter of the reactor core. Because of the single fuel assembly at the center of the reactor core, the quantity of the new fuel assemblies is not equal to that of the spent fuel assemblies having burned once. At the end of the twelfth cycle of operating unit NO. 1, 72 spent fuel assemblies having burned once and 69 spent fuel assemblies having burned twice are obtained, as shown in FIG. 15.

Figure 9:
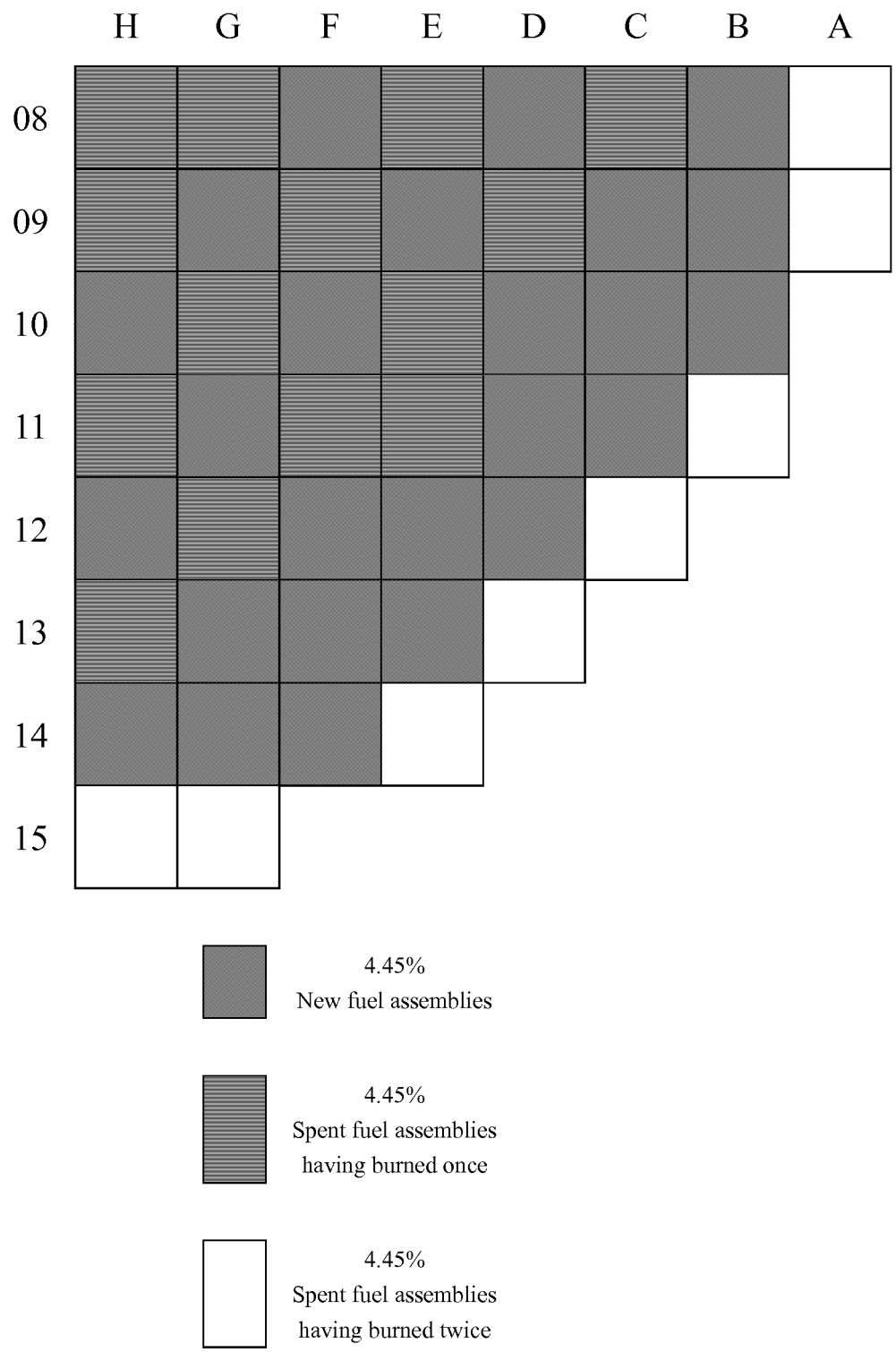
FIG. 9 is a loading pattern of the first reactor core with 88 new fuel assemblies for the new starting units in the method for the joint configuration of nuclear power plant fuel elements/assemblies according to the present invention.

As shown in FIG. 13, 16 new fuel assemblies with an enrichment of 4.45% are added to the thirteenth cycle of operating unit NO. 1. Such that the number of the new fuel assemblies in the thirteenth cycle of operating unit NO. 1 is increased to 88. With the fuel cycle length guaranteed, the number of the needed spent fuel assemblies having burned once as shown in FIG. 9 is reduced to 41, and the number of the spent fuel assemblies having burned twice is increased to 28. As a result, the reactor core now comprises 88 new fuel assemblies, 41 spent fuel assemblies having burned once and 28 spent fuel assemblies having burned twice. As shown in FIG. 15, after the burned assemblies discharged at the end of the twelfth cycle of operating unit NO. 1 are reloaded to construct the thirteenth cycle of operating unit NO. 1, 31 (72−41=31) spent fuel assemblies having burned once and 41 (69−28=41) spent fuel assemblies having burned twice are remained in reserve.

Figure 16:
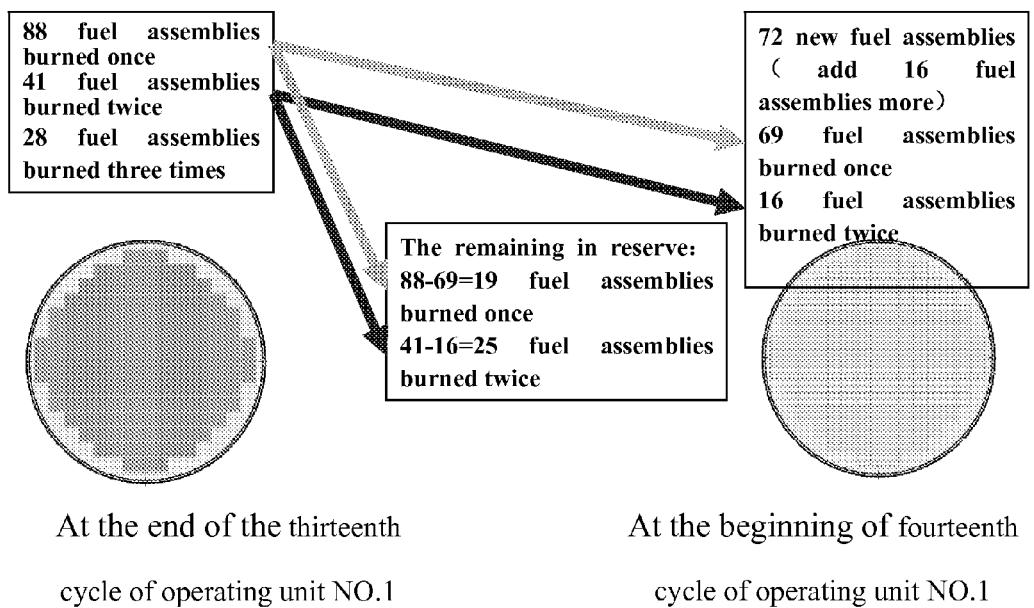
FIG. 16 is a schematic view when the arrangement with 88 new fuel assemblies in the operating units is changed to that with 72 new fuel assemblies in the method for the joint configuration of nuclear power plant fuel elements/assemblies according to the present invention.

As shown in FIG. 16, after the thirteenth cycle of operating unit NO. 1 with the number of the new fuel assemblies increased to 88 has passed one fuel cycle, 88 spent fuel assemblies having burned once and 41 spent fuel assemblies having burned twice can be obtained. The fourteenth cycle of operating unit NO. 1 returns into the loading mode of equilibrium circle that is shown in FIG. 1 where there are 72 new fuel assemblies, 69 spent fuel assemblies having burned once and 16 spent fuel assemblies having burned twice, so 69 spent fuel assemblies having burned once and 16 spent fuel assemblies having burned twice are required. As shown in FIG. 16, after the construction of the fourteenth cycle of operating unit NO. 1 is completed, 19 (88−69=19) spent fuel assemblies having burned once and 25 (41−16=25) spent fuel assemblies having burned twice are remained in reserve.

Figure 17:
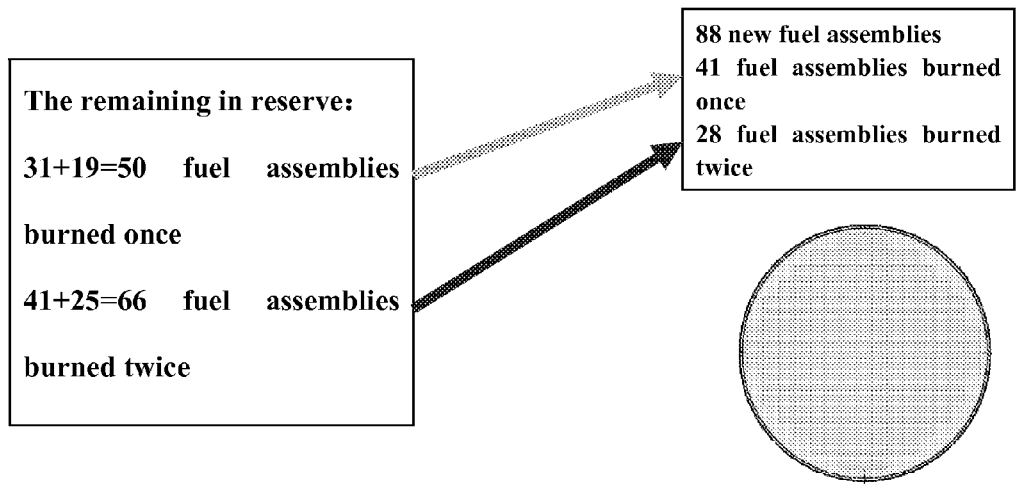
FIG. 17 is a schematic view when the new fuel assemblies, the spent fuel assemblies in reserve having burned once and the spent fuel assemblies having burned twice are loaded to construct the first cores of the new starting units in the method for the joint configuration of nuclear power plant fuel elements/assemblies according to the present invention.

As shown in FIG. 17, by only one flexibility cycle of the thirteenth cycle of operating unit NO. 1 in which 16 new fuel assemblies are added, 50 (31+19=50) spent fuel assemblies having burned once and 66 (41+25=66) spent fuel assemblies having burned twice can be obtained for reserve.

Figure 2:
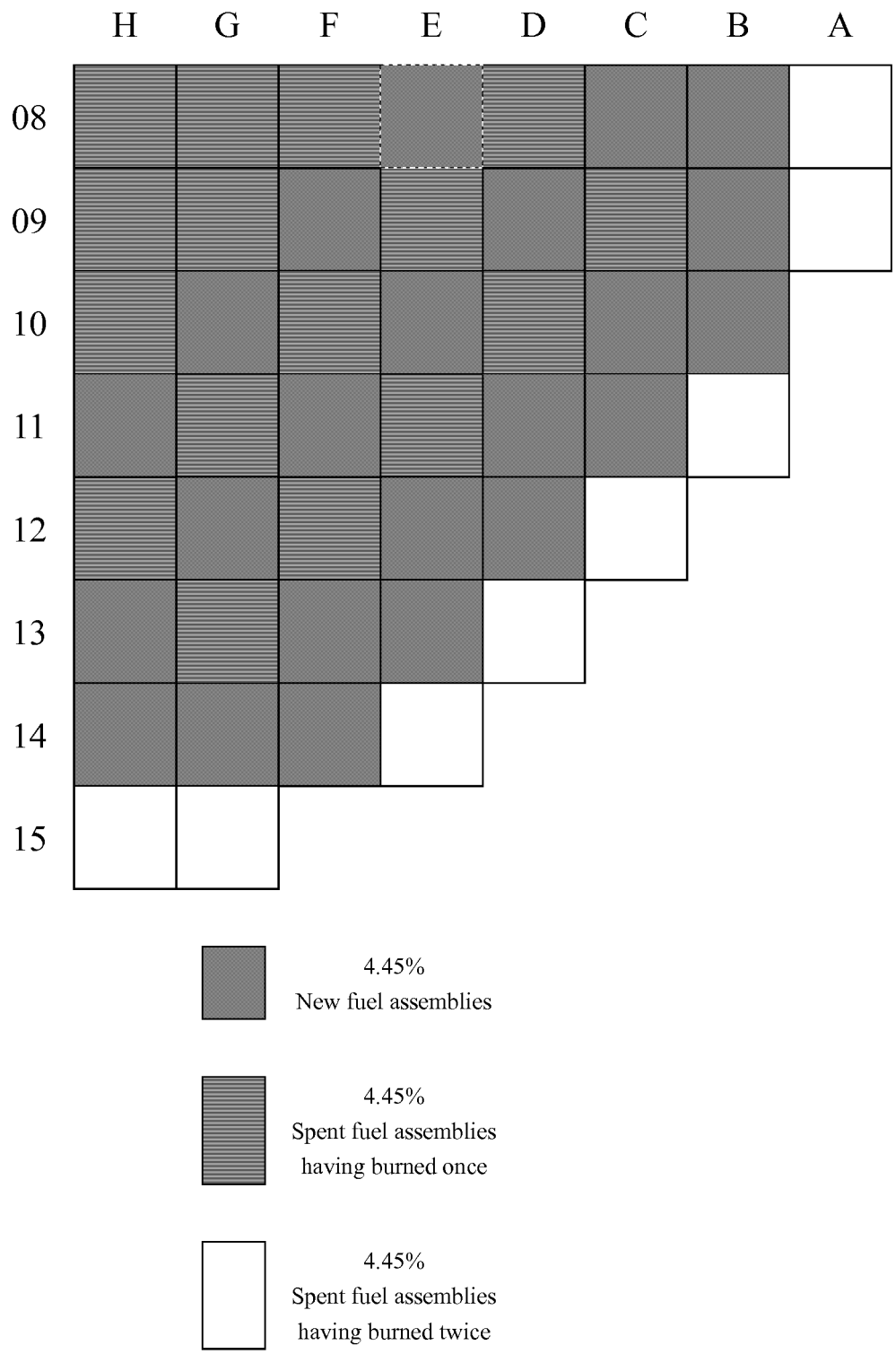
FIG. 2 is the first loading pattern of the first reactor core with 80 new fuel assemblies for the new starting units in the method for the joint configuration of nuclear power plant fuel elements/assemblies according to the present invention.
Figure 3:
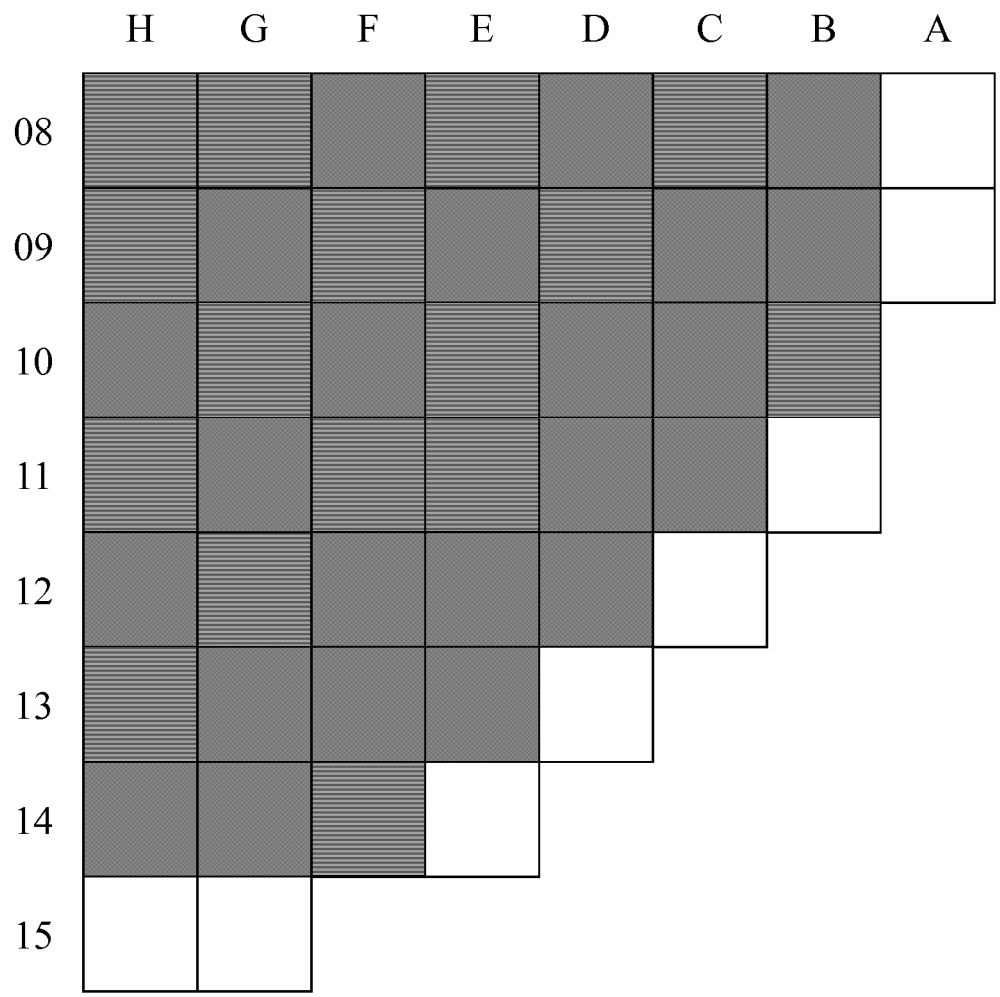
FIG. 3 is the second loading pattern of the first reactor core with 80 new fuel assemblies for the new starting units in the method for the joint configuration of nuclear power plant fuel elements/assemblies according to the present invention.
Figure 4:
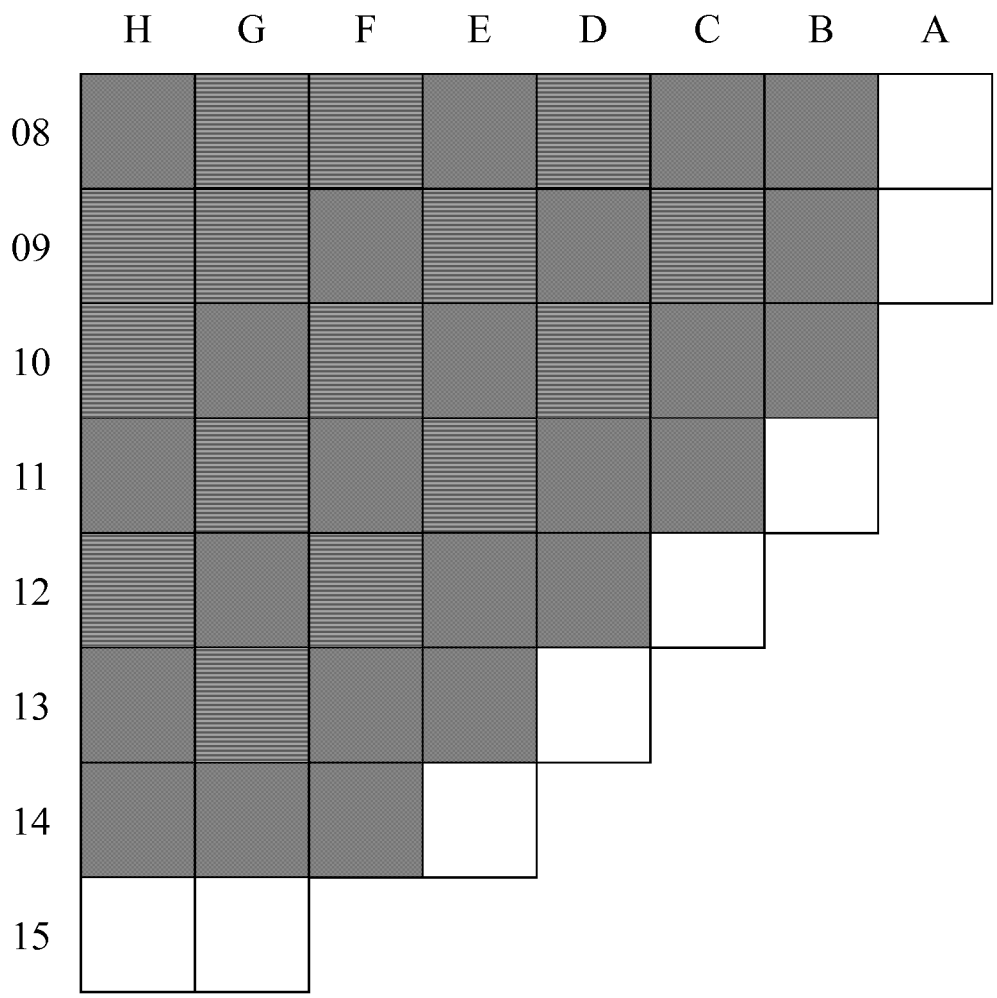
FIG. 4 is the first loading pattern of the first reactor core with 81 new fuel assemblies for the new starting units in the method for the joint configuration of nuclear power plant fuel elements/assemblies according to the present invention.
Figure 4:
Figure 4:
Figure 4:
Figure 5:
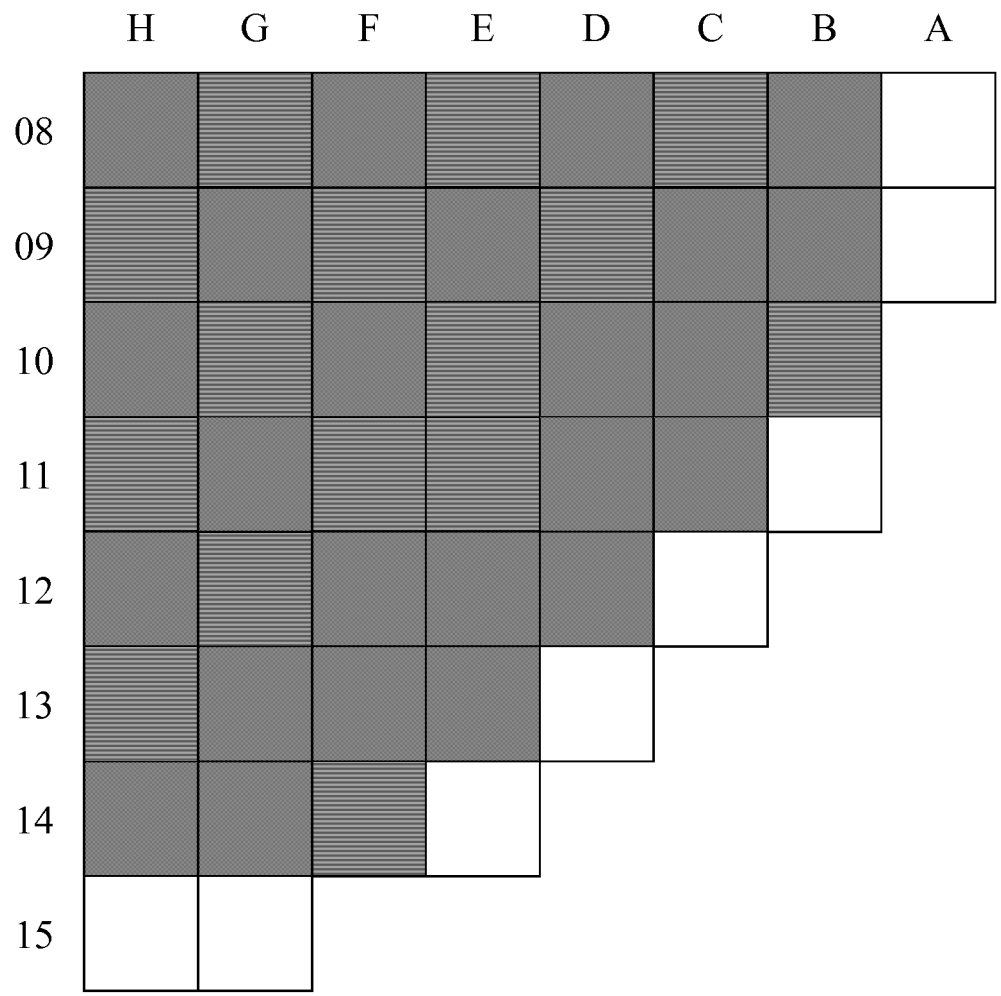
FIG. 5 is the second loading pattern of the first reactor core with 81 new fuel assemblies for the new starting units in the method for the joint configuration of nuclear power plant fuel elements/assemblies according to the present invention.
Figure 6:
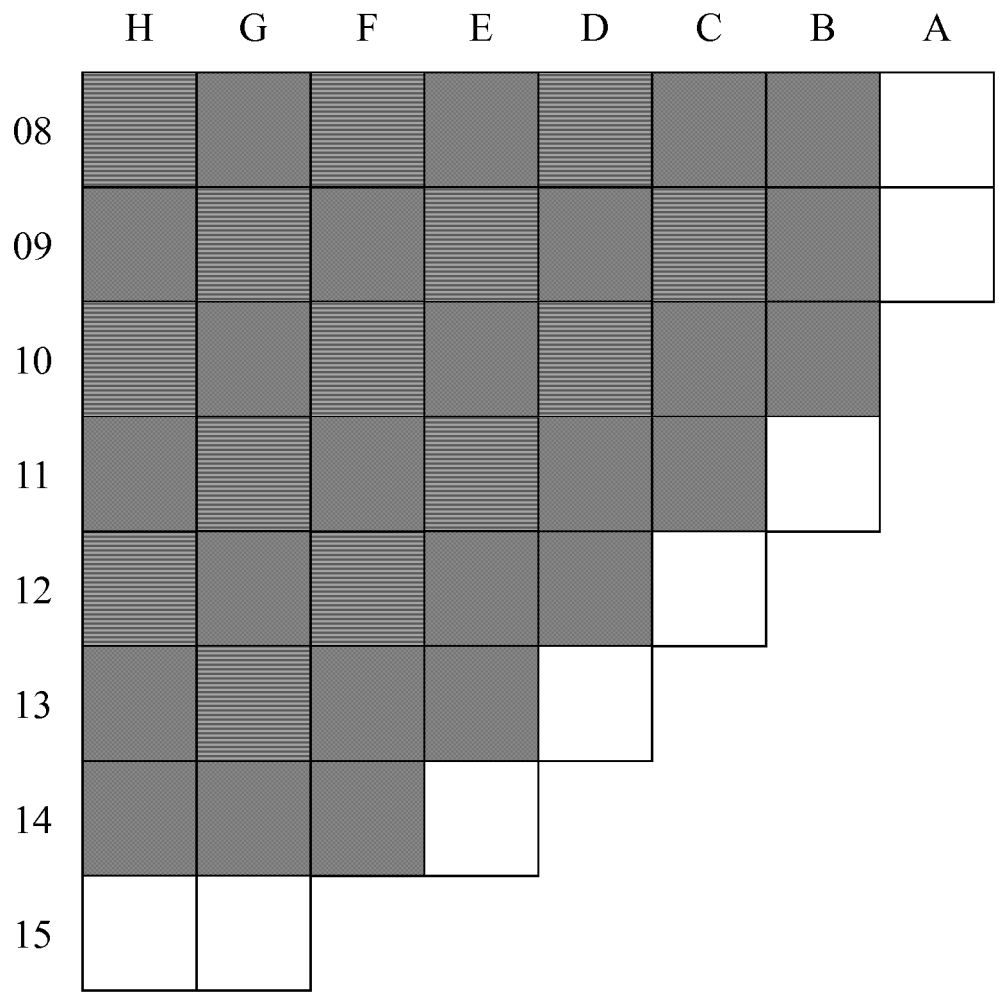
FIG. 6 is the first loading pattern of the first reactor core with 84 new fuel assemblies for the new starting units in the method for the joint configuration of nuclear power plant fuel elements/assemblies according to the present invention.
Figure 6:
Figure 6:
Figure 6:
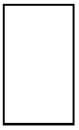
Figure 7:
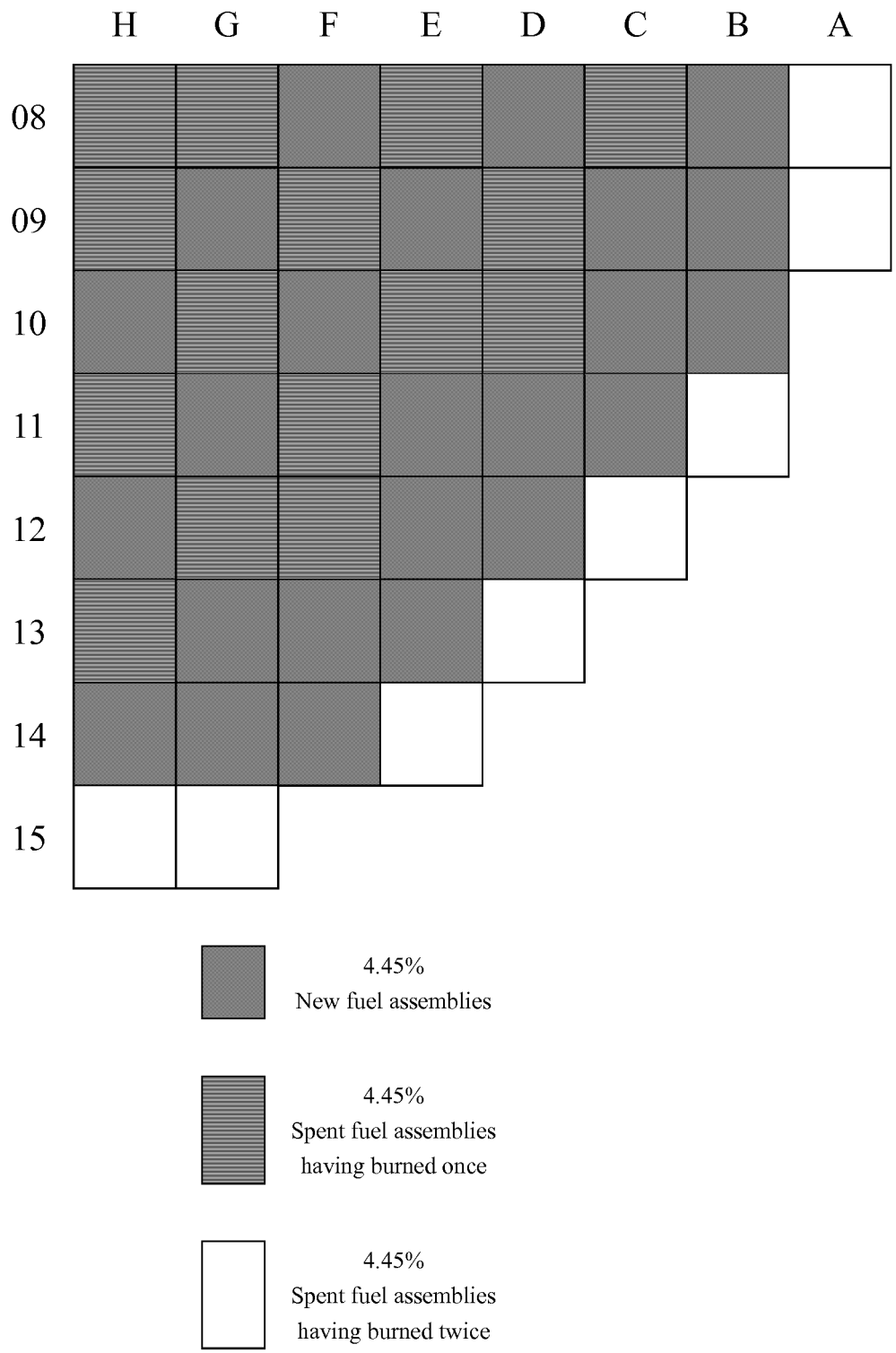
FIG. 7 is the second loading pattern of the first reactor core with 84 new fuel assemblies for the new starting units in the method for the joint configuration of nuclear power plant fuel elements/assemblies according to the present invention.
Figure 8:
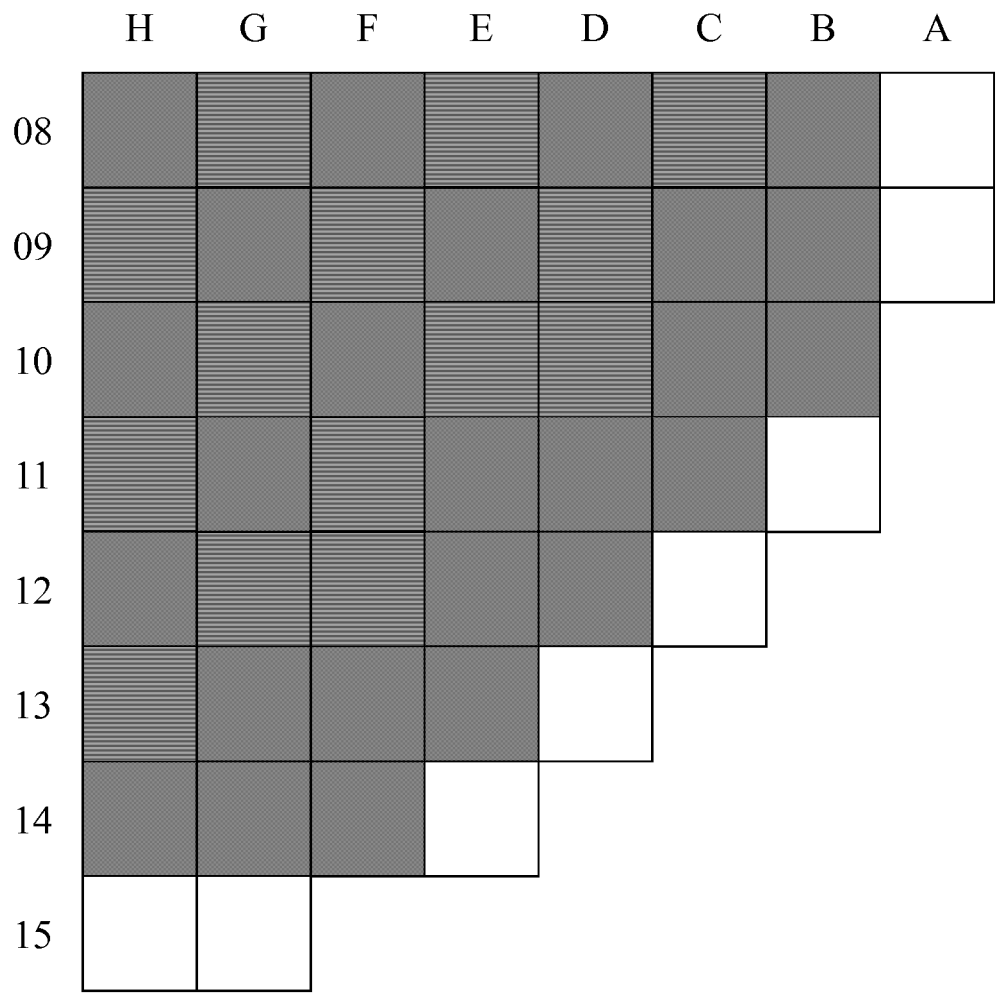
FIG. 8 is a loading pattern of the first reactor core with 85 new fuel assemblies for the new starting units in the method for the joint configuration of nuclear power plant fuel elements/assemblies according to the present invention.
Figure 10:
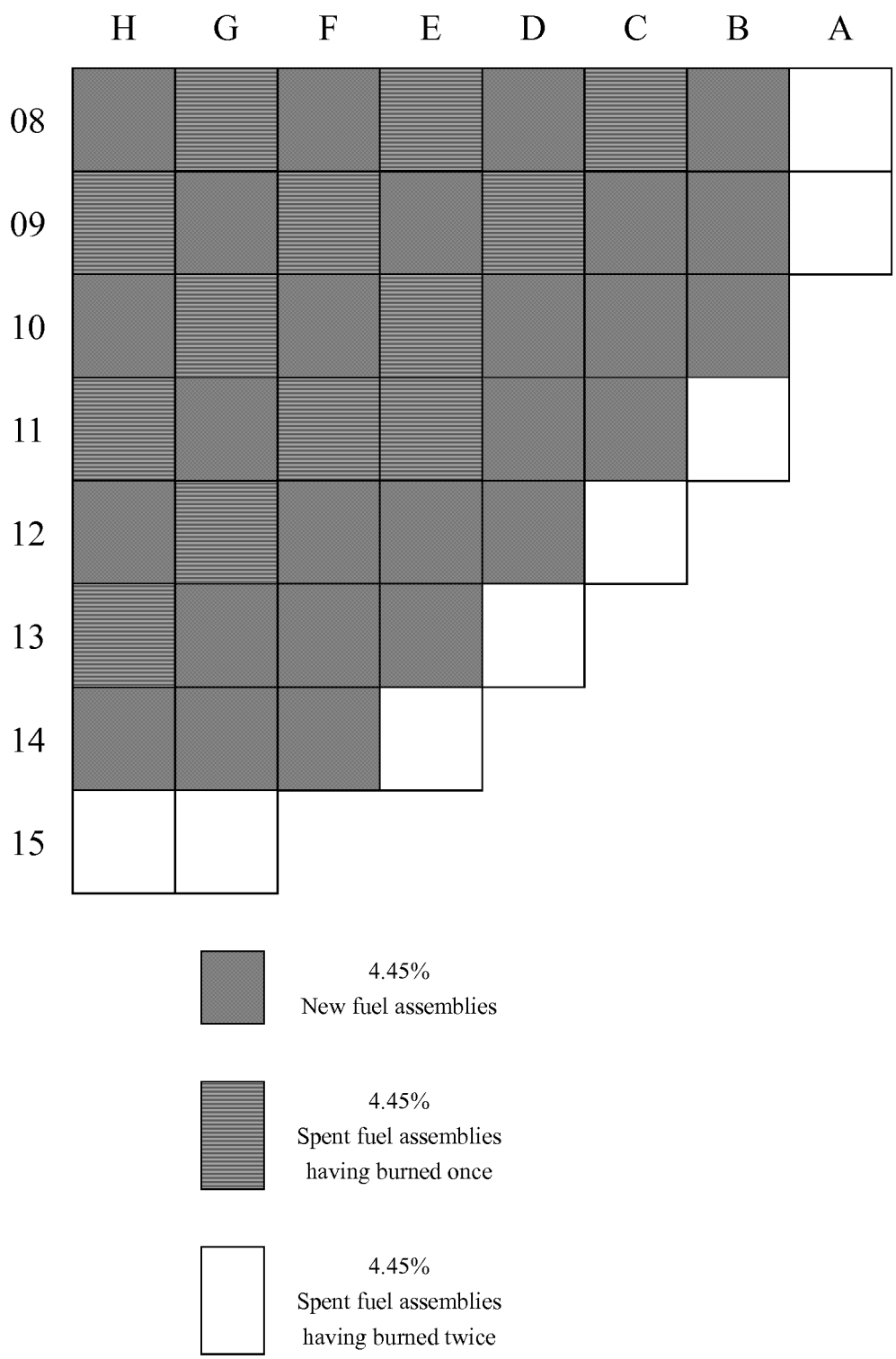
FIG. 10 is a loading pattern of the first reactor core with 89 new fuel assemblies for the new starting units in the method for the joint configuration of nuclear power plant fuel elements/assemblies according to the present invention.
Figure 11:
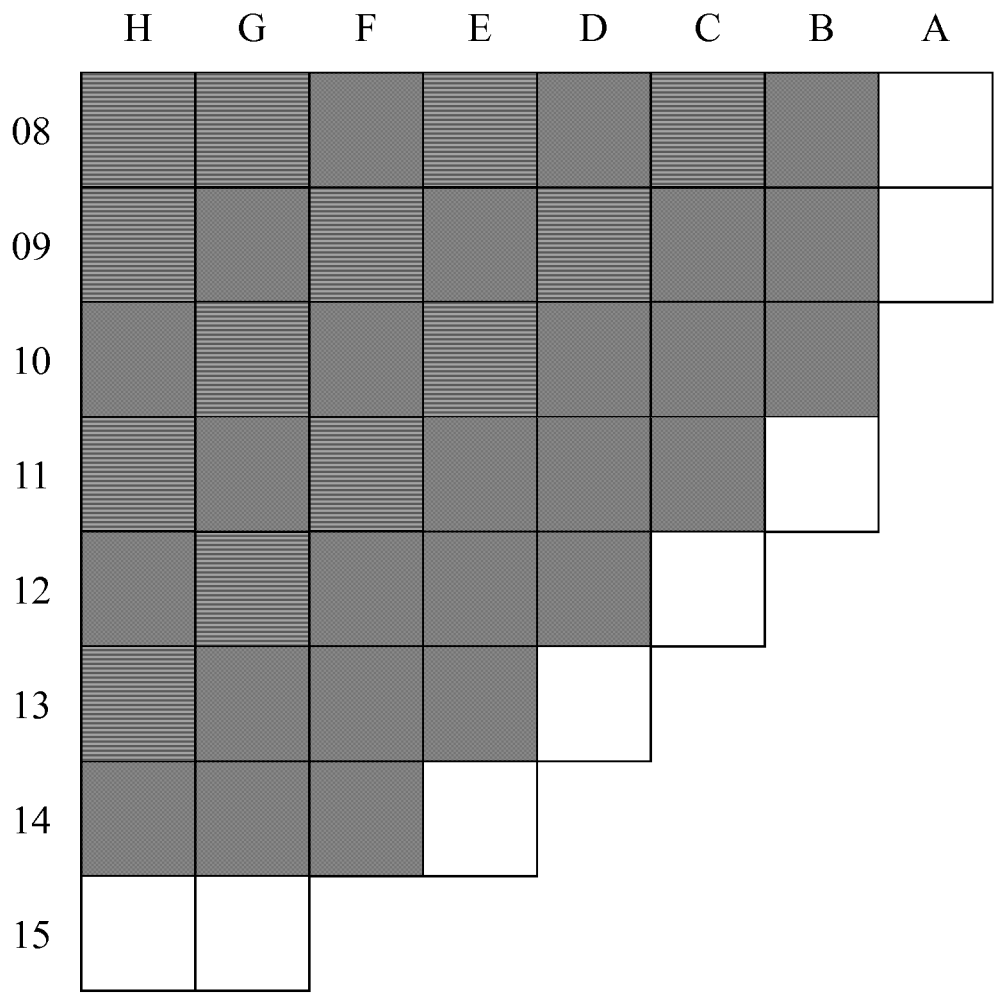
FIG. 11 is a loading pattern of the first reactor core with 92 new fuel assemblies for the new starting units in the method for the joint configuration of nuclear power plant fuel elements/assemblies according to the present invention.
Figure 12:
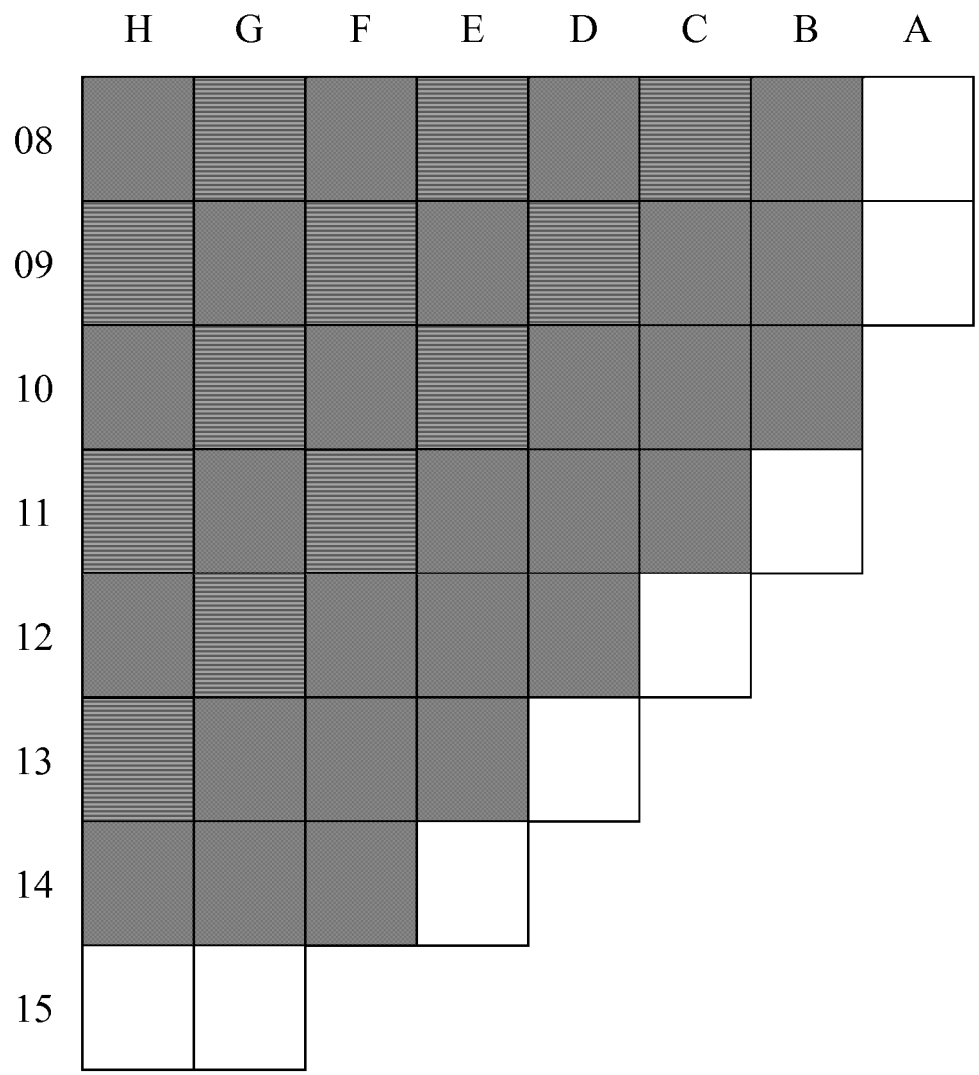
FIG. 12 is a loading pattern of the first reactor core with 93 new fuel assemblies for the new starting units in the method for the joint configuration of nuclear power plant fuel elements/assemblies according to the present invention.

The first reactor core of the new starting unit is to be constructed according to the loading mode with 88 new fuel assemblies as shown in FIG. 9 in which there are 88 new fuel assemblies, 41 spent fuel assemblies having burned once and 28 spent fuel assemblies having burned twice. So the first reactor core of the new starting unit requires 88 new fuel assemblies, 41 spent fuel assemblies having burned once and 28 spent fuel assemblies having burned twice. As shown in FIG. 17, 41 spent fuel assemblies having burned once and 28 spent fuel assemblies having burned twice are respectively selected from 50 spent fuel assemblies having burned once and 66 spent fuel assemblies having burned twice obtained for reserve. Together with 88 new fuel assemblies, they are used to construct the first reactor core of the new starting unit. Or as shown in FIG. 2 and FIG. 3, 80 new fuel assemblies, 49 spent fuel assemblies having burned once and 28 spent fuel assemblies having burned twice are loaded to construct the first reactor core of the new starting unit. Or as shown in FIG. 4 and FIG. 5, 81 new fuel assemblies, 48 spent fuel assemblies having burned once and 28 spent fuel assemblies having burned twice are loaded. Or as shown in FIG. 6 and FIG. 7, 84 new fuel assemblies, 45 spent fuel assemblies having burned once and 28 spent fuel assemblies having burned twice are loaded. Or as shown in FIG. 8, 85 new fuel assemblies, 44 spent fuel assemblies having burned once and 28 spent fuel assemblies having burned twice are loaded. Or as shown in FIG. 10, 89 new fuel assemblies, 44 spent fuel assemblies having burned once and 28 spent fuel assemblies having burned twice are loaded. Or as shown in FIG. 11, 92 new fuel assemblies, 37 spent fuel assemblies having burned once and 28 spent fuel assemblies having burned twice are loaded. Or as shown in FIG. 12, 93 new fuel assemblies, 36 spent fuel assemblies having burned once and 28 spent fuel assemblies having burned twice are loaded. As show in FIG. 2~12, with the increase of new fuel assemblies loaded, the arrangement of the new fuel assemblies and the spent fuel assemblies having burned once at the central region of the reactor core tends to be checkerboard. The checkerboard arrangement as known can improve the burnup of the spent fuel assemblies having burned once in the present cycle, improve discharge burnup and improve fuel efficiency.

In the loading mode of the second cycle of new starting unit NO. 1, there are 72 new fuel assemblies refueling every 18 months, which is identical to that in the fourteenth cycle of operating unit NO. 1, so the illustration will not be repeated again.

The quantity of the new fuel assemblies additionally added and the loading mode of the first reactor cores of the new starting units may be adjusted based on the quantity of the first cores of new starting units and of the flexibility cycles ready to run in the operating units which are involved in the method for joint configuration design of nuclear power plant fuel elements/assemblies. For the reactor core described above with 18-month refueling and low leakage, 80, 81, 84, 85, 88, 89, 92 or 93 new fuel assemblies may be added, referring to the loading patterns as shown in FIG. 2~FIG. 12 respectively.

As the present inventing is not limited to the low leakage loading mode of in-in-out described above, in-out-in, high leakage (a part of new assemblies being placed in the peripheral place) and other loading mode are also applicable. So more reactor core loading modes may be utilized and more new fuel assemblies with relatively high enrichments may be added to the operating units. The loading patterns described above are just used for illustrating rather than limiting. The in-in-out loading mode mentioned above is the fuel elements/assemblies loading mode in which new fuel elements/assemblies are placed in the central places during the first burning cycle of the fuel elements/assemblies, in the central places during the second burning cycle of the fuel elements/assemblies, and in the peripheral places during the third burning cycle of the fuel elements/assemblies. While the in-out-in loading mode (able to lower the temperature difference at the outlet of the reactor core) is the fuel elements/assemblies loading mode in which new fuel elements/assemblies are placed in the central places during the first burning cycle of the fuel elements/assemblies, in the peripheral places during the second burning cycle of the fuel elements/assemblies, and in the central places again during the third burning cycle of the fuel elements/assemblies.

Figure 18:
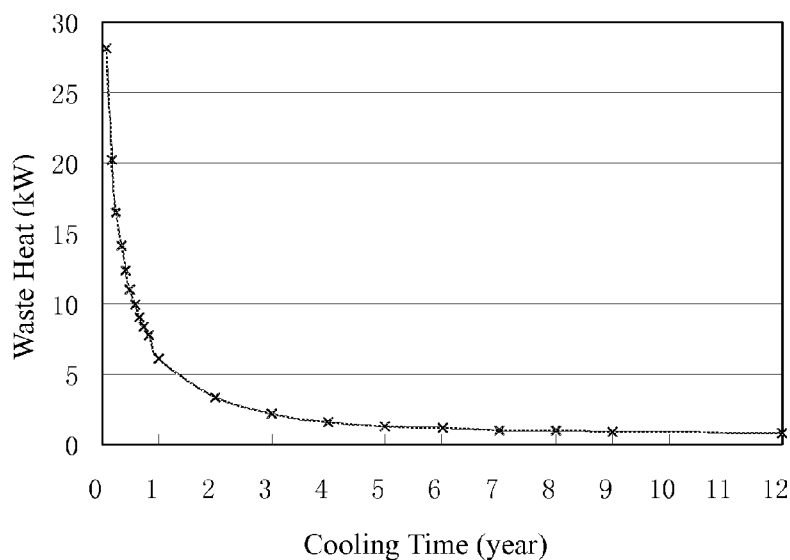
FIG. 18 shows the change curve of the decay heat of the spent fuel elements/assemblies vs. time.

The spent fuel elements/assemblies having burned are different from the new fuel elements/assemblies. The spent fuel elements/assemblies themselves have strong radiation and decay heat, and FIG. 18 shows the decay heat of a single fuel element/assembly as a function of cooling time. The decay heat decreases rapidly in the early phase, and slowly in the later phase. In the limiting case with an enrichment of 4.45% and a burnup of 55000 MWd/tU, the decay heat after one-year cooling is less than 6.1 kW, while the actual average decay heat after one-year cooling of the spent fuel elements/assemblies is less than 4 kW. If the spent fuel elements/assemblies are to be transported from one unit to another, a transporting container of spent fuel which satisfies the requirements is needed, wherein, the longer cooling time, the lower the requirements. There are a large number of mature commercial large transporting containers of spent fuel which may be used for transporting the spent fuel elements/assemblies having been cooled for only one year. The known transporting container of spent fuel which can transport the spent PWR fuel elements/assemblies with more than 5 kW decay heat are shown in the following table 1.

TABLE 1

| | | Technical Requirements | | | |
|---|---|---|---|---|---|
| Owner | Container Model | The Number of Loaded Spent Fuel Assemblies | Maximum Heat Load (kW) | Maximum Average heat load of the Spent Fuel Assemblies (kW per one) | Total Weight (t) |
| GE | IF-3000 | 7 | 68-70 | 9.7-10 | 60.7 |
| BNG | NTL-14 | 5 | 45 | 9 | 85 |
| Lehrer | LK-80 | 12 | 100 | 8.3 | 100 |
| TN | TN-12/2(A/B) | 12 | 93/70 | 7.8/5.8 | 102/104 |
| NAC | NLI-10 | 10 | 70 | 7 | 97 |
| TN | TN-17/2 | 7 | 43 | 6.1 | 81 |
| PNTL | EXCELLOX-3A | 5 | 30 | 6 | 72 |
| PNTL | EXCELLOX-4 | 7 | 40 | 5.7 | 92 |
| OCL | HZ-75T | 7 | 40 | 5.7 | 82 |
| TN | TN-13 | 12 | 64 | 5.3 | 105 |
| GNS | CASTOR-S1 | 6 | 30 | 5 | 79-82 |

During the loading, unloading and transporting of the spent fuel elements/assemblies, it is necessary to ensure the critical security, cooling, shielding and isolation from the oxygen so as to avoid excessive oxidation of fuel cladding.

By implementing the joint configuration of nuclear power plant fuel elements/assemblies, the average discharge burnup of the operating units and the first reactor cores of the new starting units is 17% higher than that of the 18-month equilibrium cycle in the prior art (generally, the average discharge burnup of the first circle of the new starting unit is less than 50% of that of the equilibrium cycle). Such that the first reactor core of every new starting unit in the method for joint configuration design of nuclear power plant fuel elements/assemblies may save about 200,000 pounds of natural uranium, about 32 tons SWU (separative work units) of separative work, about fabrications of 63 fuel assemblies, and about post-processes of 63 spent fuel elements/assemblies, resulting in the total savings of about $69.63 million which take up 23.4% of the total fuel costs of the first core. The cost savings may vary as the model, the reactor type, the joint configuration of the nuclear power plant fuel elements/assemblies and the price of natural uranium and separation work.

Figure 14:
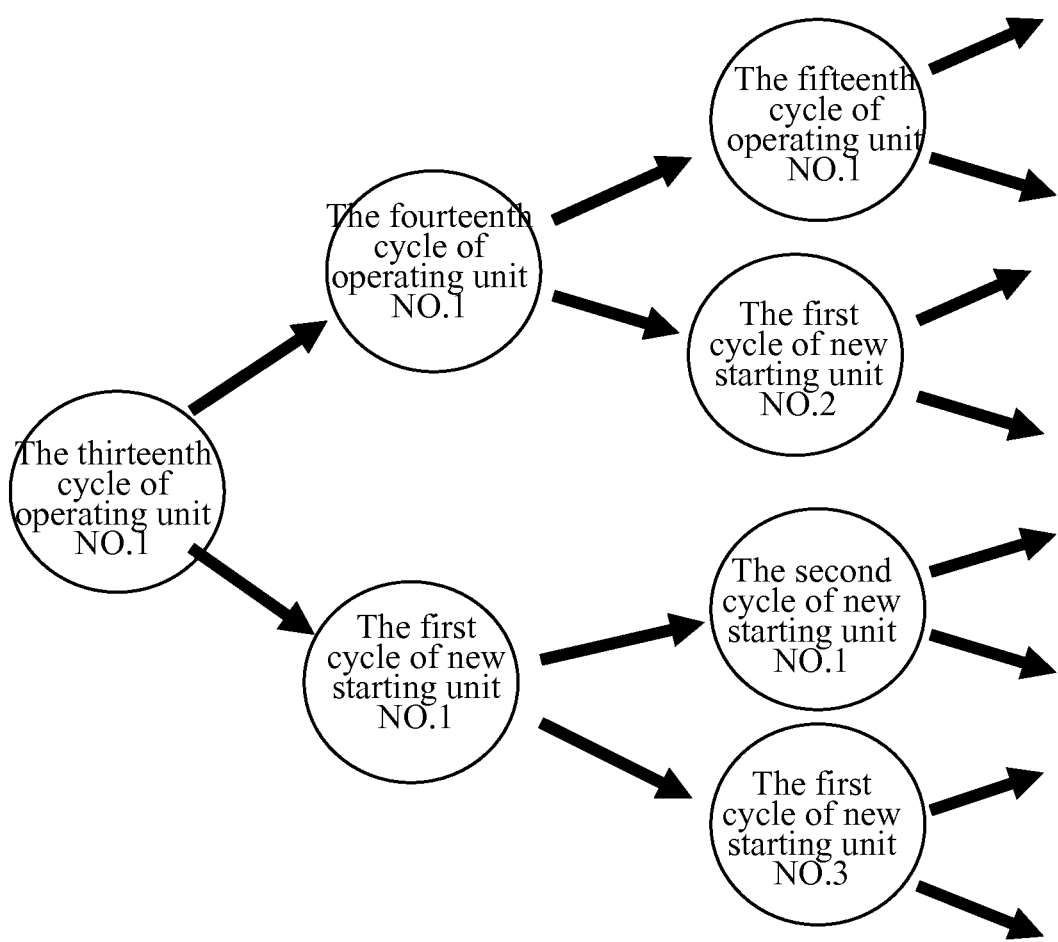
FIG. 14 is a schematic view of the joint configuration with new starting units added continuously in the method for the joint configuration of nuclear power plant fuel elements/assemblies according to the present invention.

With the new starting units with the first cores adding continuously, the joint configuration of the nuclear power plant fuel elements/assemblies can be implemented continuously (as shown in FIG. 14). The arrows in the figure just indicate the transfer of the spent fuel elements/assemblies having burned once, and the spent fuel elements/assemblies having burned twice are from what accumulated in the long-term running process of the operating units, and the new fuel elements/assemblies are purchased from fuel suppliers.

For units refueling when shutdown, the operating units implementing the joint configuration of the nuclear power plant fuel elements/assemblies may utilize 18-month refueling mode, 12-month refueling mode with quarter of fuel assemblies changed, 12-month refueling mode with third of fuel assemblies changed or other refueling modes. The first reactor cores of the new starting units may construct their first reactor cores directly based on the requirements of the needed refueling mode, so as to attain 18-month refueling mode, 12-month refueling mode with quarter of fuel assemblies changed, 12-month refueling mode with third of fuel assemblies changed or other refueling modes directly.

For the fuel elements/assemblies joint configuration among the operating units, when there are several operating units which comprises the long-term and short-term operating units. The steps of the joint configuration of fuel elements/assemblies among the operating units are as follows:

(B1) based on the equilibrium cycle configuration design, the spent fuel elements/assemblies having burned once which are original arranged in the peripheral place of the long-term operating units are replaced by the spent fuel elements/assemblies having burned twice, so as to obtain excess spent fuel elements/assemblies having burned once for reserve;

(B2) the excess spent fuel elements/assemblies having burned once for reserve and a part of spent fuel elements/assemblies in the long-term operating units are arranged in the short-term operating units.

Take the joint configuration design of nuclear fuel elements/assemblies of the operating units in 18-month refueling mode and 12-month refueling mode with quarter of fuel assemblies changed for example, further illustration is as follow.

The operating units in 18-month refueling mode have the advantage of high available rate but the average discharge burnup of fuel is relatively low. The operating units in 12-month refueling mode with quarter of fuel assemblies changed have the advantage of high average discharge burnup of fuel. 12 spent fuel assemblies having burned once which are original arranged in the peripheral place of the operating units in 18-month refueling mode (as shown in FIG. 1) are replaced by the spent fuel assemblies having burned twice. The excess spent fuel assemblies having burned once for reverse and a part of the spent fuel assemblies that can not be used in the operating units refueling every 18 months but can be used in the operating units refueling every year with quarter of fuel assemblies changed are arranged into the reactor core of the operating units refueling every year with quarter of fuel assemblies changed for continuously combusting, so as to reduce the quantity of the new fuel assemblies required in the operating units refueling every year with quarter of fuel assemblies changed and to improve total fuel efficiency. So when the fuel elements/assemblies joint configuration is conducted by the reactor core of the operating units in long-term refueling mode and that in short-term refueling mode, the disadvantage of lower fuel efficiency of the operating units in long-term refueling mode can be partially compensated.

The joint configuration design described above also can be applied to the units refueling when non-shutdown. Take the Pebble bed high temperature gas cooled reactor (HTR) units for example in the following to further illustrate the application of the present invention on the units refueling when non-shutdown.

New fuel elements with relatively high enrichments same or similar to that in the equilibrium cycle are added additionally and gradually into the HTR units, and a large number of spent fuel elements with different burnups are discharged gradually for reverse; and then the spent fuel elements with different burnup having been discharged and in reserve and the new fuel elements with relatively high enrichments are mixed and loaded into the first core of the new starting units. The first cores of the new starting units may not use the fuel elements with a relatively low enrichment any longer wherein the discharge burnup is higher than that in the equilibrium cycle, so as to improve fuel efficiency significantly and save fuel costs.

In the case where a number of fuel elements/assemblies appear damaged in one unit, a number of spent fuel elements/assemblies may be obtained from other operating units by the method for joint configuration design of nuclear power plant fuel elements/assemblies, as a result, the method for joint configuration design of nuclear power plant fuel elements/assemblies can also improve the ability of units to resist risk of fuel damage.

The present invention is described by several specific embodiments. It should be understood for a person skilled in the art that various change and equivalent alternations can be made without departing from the scope of the present invention. Additionally, for specific circumstances or situation, various modifications can be made without departing from the scope of the present invention. So, the present invention is not limited to the specific embodiments in disclosure, and should comprise all the embodiments fallen into the scope of the appended claims of present invention.

What is claimed is:

1. A method for configuring nuclear power plant fuel elements/assemblies jointly, comprising steps for configuring fuel elements/assemblies jointly between at least one operating unit and at least one new starting unit with a first reactor core:

(S1) adding at least one new fuel element/assembly to the at least one operating unit according to an equilibrium cycle or transition cycle reactor core configuration design;

(S2) after running a fuel cycle, obtaining spent fuel elements/assemblies having burned once from the at least one operating unit based on an amount of added new fuel elements/assemblies loaded in step (S1), and keeping said spent fuel elements/assemblies for further use, wherein, an amount of the spent fuel elements/assemblies having burned once from the at least one operating unit is larger than that of the spent fuel elements/assemblies obtained in the equilibrium cycle or transition cycle reactor core configuration design;

(S3) putting a scheduled number of new fuel elements/assemblies, and the spent fuel elements/assemblies having burned once which are obtained from step (S2) in the first reactor cores of the at least one new starting unit.

2. The method for configuring nuclear power plant fuel elements/assemblies jointly of claim 1, between the steps (S2) and (S3), further comprising storage of the spent fuel elements/assemblies having burned once which are obtained from step (S2) in a spent fuel pool or spent fuel storage container, which storage satisfies requirements of safe transporting after storage.

3. The method for configuring nuclear power plant fuel elements/assemblies jointly of claim 2, wherein, the step (S3) also comprises arranging a scheduled number of spent fuel elements/assemblies having burned twice into the first reactor core of the at least one new starting unit.

4. The method for configuring nuclear power plant fuel elements/assemblies jointly of claim 2, wherein, in step (S1), one to twenty-nine new fuel assemblies are added to the at least one operating unit according to the equilibrium cycle or transition cycle reactor core configuration design.

5. The method for configuring nuclear power plant fuel elements/assemblies jointly of claim 2, wherein, there are several operating units which comprise long-term and short-term operating units; and there are steps for configuring fuel elements/assemblies among the long-term and short-term operating units:

(B1) based on reactor cores configuration design of a long-term equilibrium cycle or transition cycle, the spent fuel elements/assemblies having burned once which are arranged in peripheral places of the long-term operating units are replaced by the spent fuel elements/assemblies having burned twice, so as to obtain remain spent fuel elements/assemblies having burned once for further use;

(B2) the remain spent fuel elements/assemblies having burned once for further use and the spent fuel elements/assemblies in the long-term operating units are arranged in the short-term operating units;

the long-term operating units refuel every 18 months or every 24 months; the short-term operating units refuel every quarter or third year.

6. The method for configuring nuclear power plant fuel elements/assemblies jointly of claim 1, wherein, the arrangement of the first reactor core of the at least one new starting unit is based on a refueling mode in which the at least one operating units add the new fuel elements/assemblies.

7. The method for configuring nuclear power plant fuel elements/assemblies jointly of claim 6, wherein, the step (S3) also comprises arranging a scheduled number of spent fuel elements/assemblies having burned twice into the first reactor core of the at least one new starting unit.

8. The method for configuring nuclear power plant fuel elements/assemblies jointly of claim 6, wherein, in step (S1), one to twenty-nine new fuel assemblies are added to the at least one operating unit according to the equilibrium cycle or transition cycle reactor core configuration design.

9. The method for configuring nuclear power plant fuel elements/assemblies jointly of claim 6, wherein, there are several operating units which comprise long-term and short-term operating units; and there are steps for configuring fuel elements/assemblies jointly among the long-term and short-term operating units:

(B1) based on reactor cores configuration design of a long-term equilibrium cycle or transition cycle, the spent fuel elements/assemblies having burned once which are arranged in peripheral places of the long-term operating units are replaced by the spent fuel elements/assemblies having burned twice, so as to obtain remain spent fuel elements/assemblies having burned once for further use;

(B2) the remain spent fuel elements/assemblies having burned once for further use and the spent fuel elements/assemblies in the long-term operating units are arranged in the short-term operating units;

the long-term operating units refuel every 18 months or every 24 months; the short-term operating units refuel every quarter or third year.

10. The method for configuring nuclear power plant fuel elements/assemblies jointly claim 1, wherein, the spent fuel elements/assemblies having burned once and the new fuel elements/assemblies are arranged in alternation order in the reactor core of the at least one operating unit or in the first reactor core of the new starting unit, such that the new fuel elements/assemblies are arranged around the spent fuel elements/assemblies having burned once.

11. The method for configuring nuclear power plant fuel elements/assemblies jointly of claim 10, wherein, the step (S3) also comprises arranging a scheduled number of spent fuel elements/assemblies having burned twice into the first reactor core of the at least one new starting unit.

12. The method for configuring nuclear power plant fuel elements/assemblies jointly of claim 10, wherein, in step (S1), one to twenty-nine new fuel assemblies are added to the at least one operating unit according to the equilibrium cycle or transition cycle reactor core configuration design.

13. The method for configuring nuclear power plant fuel elements/assemblies jointly of claim 10, wherein, there are several operating units which comprise long-term and short-term operating units; and there are steps for configuring fuel elements/assemblies jointly among the long-term and short-term operating units:

(B1) based on reactor cores configuration design of a long-term equilibrium cycle or transition cycle, the spent fuel elements/assemblies having burned once which are arranged in peripheral places of the long-term operating units are replaced by the spent fuel elements/assemblies having burned twice, so as to obtain remain spent fuel elements/assemblies having burned once for further use;

(B2) the remain spent fuel elements/assemblies having burned once for further use and the spent fuel elements/assemblies in the long-term operating units are arranged in the short-term operating units;

the long-term operating units refuel every 18 months or every 24 months; the short-term operating units refuel every quarter or third year.

14. The method for configuring nuclear power plant fuel elements/assemblies jointly of claim 1, wherein, the step (S3) also comprises arranging a scheduled number of spent fuel elements/assemblies having burned twice into the first reactor core of the at least one new starting unit.

15. The method for configuring nuclear power plant fuel elements/assemblies jointly of claim 1, wherein, in step (S1), one to twenty-nine new fuel assemblies are added to the at least one operating unit according to the equilibrium cycle or transition cycle reactor core configuration design.

16. The method for configuring nuclear power plant fuel elements/assemblies jointly of claim 1, wherein, 1, 4, 5, 8, 9, 12, 13, 16, 17, 20, 21, 24, 25, 28 or 29 new fuel assemblies are added to the at least one operating unit.

17. The method for configuring nuclear power plant fuel elements/assemblies jointly of claim 1, wherein, in step (S1), reactor cores of the at least one operating unit have 157 fuel assemblies;

in step (S3), the first reactor cores of the at least one new starting unit comprise eighty to one hundred new fuel assemblies, thirty to forty-nine spent fuel assemblies having burned once and spent fuel assemblies having burned twice loaded in the rest places.

18. The method for configuring nuclear power plant fuel elements/assemblies jointly of claim 1, wherein, there are several operating units which comprise long-term and short-term operating units; and there are steps for configuring fuel elements/assemblies jointly among the long-term and short-term operating units:

(B1) based on reactor cores configuration design of a long-term equilibrium cycle or transition cycle, the spent fuel elements/assemblies having burned once which are arranged in peripheral places of the long-term operating units are replaced by the spent fuel elements/assemblies having burned twice, so as to obtain remain spent fuel elements/assemblies having burned once for further use;

(B2) the remain spent fuel elements/assemblies having burned once for further use and the spent fuel elements/assemblies in the long-term operating units are arranged in the short-term operating units;

the long-term operating units refuel every 18 months or every 24 months; the short-term operating units refuel every quarter or third year.

19. The method for configuring nuclear power plant fuel elements/assemblies jointly of claim 1, wherein, the new fuel elements/assemblies and the new fuel elements/assemblies used in the equilibrium cycle has same enrichments.

* * * * *